Feb. 14, 1939.  A. NAGEL  2,146,908
SHUTTER CONTROLLING MECHANISM
Filed Feb. 4, 1937
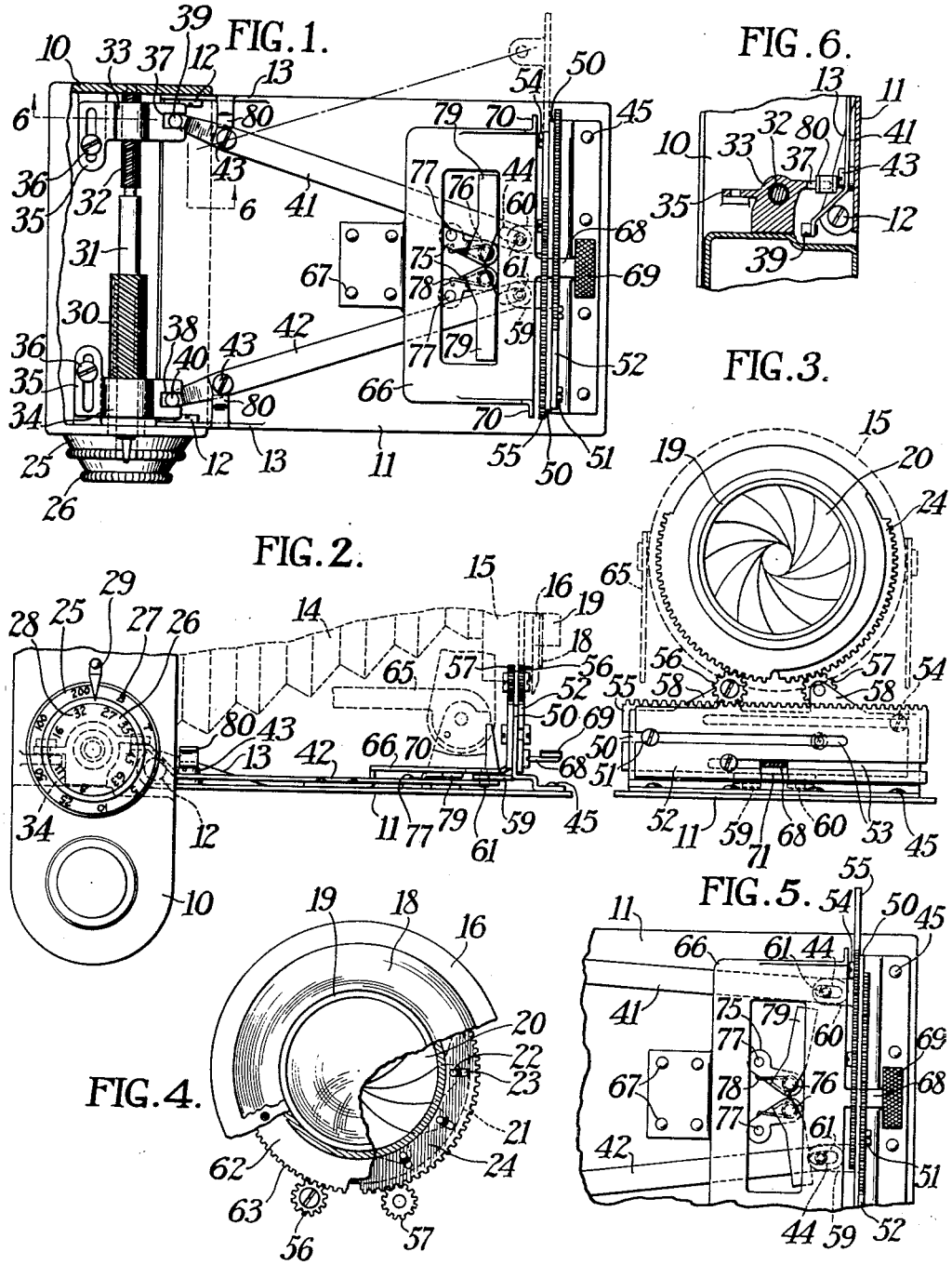
August Nagel
INVENTOR.
BY Newton M. Perrins
Ronald H. Stewart
ATTORNEYS Patented Feb. 14, 1939

2,146,908

UNITED STATES PATENT OFFICE 2,146,908

SHUTTER CONTROLLING MECHANISM

August Nagel, Stuttgart, Germany, assignor to Eastman Kodak Company, Rochester, N. Y., a corporation of New Jersey Application February 4, 1937, Serial No. 124,069
In Germany September 2, 1936

22 Claims. (Cl. 95—53)

This invention relates to photography, and more particularly to shutter controlling mechanism for cameras.

One object of my invention is to provide a shutter controlling mechanism mounted on the camera body which is adapted to transmit motion to the shutter controlling mechanism carried by the usual camera shutter. Another object of my invention is to provide such controlling mechanism in which connections are provided between the camera shutter and the camera body which can be moved from the camera body. Another object of my invention is to provide a folding mechanism with folding operating members extending between the camera body and the camera shutter, so that the camera shutter can be set from the camera body. Another object of my invention is to provide an interlocking arrangement in a folding camera adapted to prevent the camera from folding until the shutter controlling mechanism has been moved to a predetermined position. Another object of my invention is to provide a camera body with shutter setting mechanism and with connections between the shutter setting mechanism and the shutter, these connections being adapted to cooperate when the camera is in an open or picture-taking position, and being adapted to separate when the camera is in a folded position. Still another object of my invention is to provide a latching device by which the shutter controlling mechanism mounted on the camera body will be latched against movement when the camera parts are folded. Still another object of my invention is to provide such a latching mechanism which is automatically released when the camera is opened. A still further object of my invention is to provide a pair of coaxial setting dials on the camera body which are interconnected with the usual setting members on the camera shutter, so that the speed of the shutter and the diaphragm opening of the shutter can both be adjusted from the camera body, and other objects will appear from the following specification, the novel features being particularly pointed out in the claims at the end thereof.

The diaphragm, which adjustable to various apertures, and also the shutter for obtaining various exposures are both usually mounted in a common housing or shutter case located at the front or outer end of the camera bed when the latter is in operating position. It is obvious therefore that if the controls governing the two elements above mentioned, viz. shutter speed and exposure aperture are mounted on the camera body as aforesaid, that operating connections must be established between the controls and the controlled elements in the operating position, and these connections must be so arranged that they will not interfere with the convenient folding of the camera after use. It is also apparent that such connections must assume their operative position when the camera is opened for use, without special manipulation or attention. Furthermore, practical considerations such as manufacturing cost and ready assembly require a simple arrangement of easily constructed parts.

This invention therefore is directed to a simple and rugged arrangement of parts that may be applied to the common types of folding camera without requiring a complete re-design for each type. It is also a further object of the invention to produce a device which will accomplish the results above outlined without the possibility of the operator making an error through incorrect adjustment of the controlled parts, and without having to make any allowances or compensation for lost motion or other variable factors due to manufacturing inaccuracies.

A preferred form of the device above outlined is illustrated in the accompanying drawing, in which like reference characters refer to corresponding parts throughout, and in which Fig. 1 is a top plan of a camera in unfolded or operating position, the section plane being slightly above the camera bed;

Fig. 2 is a side elevation projected from Fig. 1, certain parts of the camera being shown in broken lines;

Fig. 3 is a front elevation of the parts shown in Fig. 2, part of the shutter structure being shown in broken lines;

Fig. 4 is a partial front view of the shutter housing, with the latter and the lens mount broken away to show the parts associated with the diaphragm and shutter proper;

Fig. 5 is a fragmentary plan view of part of Fig. 1, the members being in a different position relatively to the camera bed, and Fig. 6 is a fragmentary section on line 6—6 of Fig. 1 but with the camera in a folded position.

As is common in the usual types of small folding cameras, the drawing indicates a structure comprising a body 10 having a bed 11 hinged thereto at 12, by means of brackets 13 that may be either part of or attached to the bed. The usual bellows 14 may extend between the body 10 and the shutter casing which is indicated as a whole at 15.

In the present instance, the shutter is provided with a marginal ring 16, which may be rotated within definite limits to set the speed-selecting parts of the shutter. This ring may be retained by a face plate 18, concentric with the lens mount 19.

The aperture diaphragm, generally indicated by reference numeral 20, may be mounted in the shutter casing 15 one end of each of the individual movable blades being pivoted in a fixed ring 21, the other ends of the blades being provided with pins 22 that engage slots 23 in a movable ring 24, so that partial rotation of the latter may open or close the blades to vary the f. value of the exposure opening in the usual manner.

The control elements whereby the operator may select the desired shutter speed and exposure aperture are shown in the drawing as a pair of knobs concentrically mounted at one side of the camera body 10, in a convenient location for the operator. The larger or inner knob 25 in this instance is arranged to control the shutter speeds, while the smaller or outer knob 26 controls the exposure aperture. Both knobs carry appropriate scale characters 27 and 28 respectively that the operator reads at a fixed pointer 29.

The knob 25 is attached to the end of a threaded sleeve 30, revoluble in the body 10, and the knob 26 is fixed to one end of a shaft 31 that extends through said sleeve, the other end of said shaft being carried in a suitable bearing in the body 10. A nut 34 having a thread complemental to the thread 30 is mounted on the thread 30 and may move when the sleeve is turned. A threaded portion 32 on the shaft 31 passes through a similar tapped nut 33. It will be observed that the sleeve 30 and the shaft 31 may be independently turned in either direction by twisting either of the knobs 25 or 26, respectively, and that thereby the nuts 33 and 34 will be moved toward or away from the sides of the camera body, depending on which way the knobs are turned. The nuts 33 and 34 are provided with rearwardly-extending slotted flanges 35 that engage studs 36 so that said nuts cannot turn with the shaft 31 or the sleeve 30, but may only traverse toward or from the sides of the camera.

Each of the nuts 33 and 34 has forwardly-extending flanges that are notched at 37 and 38, respectively. These notches are adapted to receive pins 39 and 40 that extend upwardly from the rear ends of levers 41 and 42. These levers, pivoted to the camera bed 11 by studs 43, are capable of movement in a plane parallel to the camera bed. The lever 41, for instance, will be swung to the position indicated by broken lines in Fig. 1 by a movement of the nut 33 toward the center of the bed 11. The lever 42 will be moved correspondingly about its pivot by the traverse of nut 34 when the knob 25 is turned. The front ends of levers 41 and 42 are slotted as at 44 for a purpose to be described.

Attached to the front of the bed 11, as by rivets 45, is an upstanding plate 50, hereinafter referred to as the rack support. Studs 51 in this plate extend forwardly to serve as retainers and guides for a rack-toothed member 52, which, by reason of parallel slots 5 through which said studs project, is capable of transverse movement parallel to the bed 11. Similar studs 54 extending rearwardly from the rack support serve likewise to retain and guide a second rack-toothed member 55. The teeth of the racks 52 and 55 engage pinions 56 and 57, respectively, that are revolubly mounted on lugs 58 extending above the top of the rack support 50. Lugs 59 and 60 extend rearwardly from the rack members 52 and 55, respectively, and have pins 61 that enter the slots 44 at the front ends of levers 41 and 42.

In the shutter assembly illustrated, a ring 16, as heretofore mentioned, may be turned to selected positions for various shutter speeds. The connections between the ring and the shutter mechanism may be of many forms and therefore are not shown. The ring 16 may have a second ring member 62 attached to its rear face (Fig. 4) and teeth 63 on the periphery of ring 62 may engage the pinion 56.

If now the knob 25 is turned, the nut 34 moves toward the center line of the camera bed 11, carrying with it the pin 40 and thereby swinging lever 42 about its pivot 43. The slotted outer or front end of lever 42 is thus moved toward the right side of the camera and carries with it the rack member 52 by reason of the pin-and-slot connection between the latter and the lever, as above described. This lateral movement of rack 52 rotates the pinion 56 and the latter turns the selector ring 16 in accordance with the movement of knob 25, so that when the character "5" for instance, on the scale 27 is aligned with the fixed pointer 29, the speed-determining mechanism will have been set to give an exposure of $\frac{1}{5}$ of a second.

In like manner, the operator may turn knob 26 to open or close the diaphragm 20 to a required aperture. The threaded shaft 32 then carries the nut 33 toward the right or left, depending on the direction of rotation of said knob, and the lever 41, through its connection to the rack 55 through slot 44 and 60, moves rack 55 along the support 50, a straight-line movement being assured by the guide studs 54, and the pinion 57, rotated by its engagement with the rack 55, turns the toothed ring 24, so that if the character on the scale 28 that is at the index 29 is, for instance, 63, the f. value of the aperture will then be that figure.

It is apparent that when either or both of the racks 52 and 55 have been moved so that they project beyond the sides of the camera bed 11, the latter cannot be closed. Means are provided, therefore, which render it necessary for the operator to return the parts to "zero" position, (Fig. 1) before proceeding to swing the bed 11 to closed position.

The particular camera shown in the drawing has suitable linkage 65 that projects the shutter and lens unit to the front or operating position when the bed 11 is swung open. A release plate 66 attached at 67 to the bed 11, has a neck portion 68 extending through the rack support 50 and terminating in a finger piece 69. Lugs 70 extending upwardly from the plate 66 engage notches in a part of the linkage 65 to retain and lock the camera in the open position, this arrangement being well known and widely used. Pressure on the finger piece 69 causes the lugs 70 to move forwardly and disengage from the linkage 65 and the camera is then ready to fold.

To prevent damage to the speed-and-aperture selecting mechanism, the racks 52 and 55 are notched at 71, and these notches are aligned with the neck 68 only when the parts are in the positions shown in Figs. 1 to 3. If either of the racks 52 and 55 have been moved from the "zero" position, the neck portion 68 of the release plate 66 is intercepted thereby and pressure on the finger piece 69 will not withdraw the lugs 70 from their linkage-locking positions.

A further "safety" device is provided to prevent the closing of the camera bed when the levers 41 and 42 and associated parts have been moved from the "zero" position. Bell-crank members 75 are pivoted to the bed 11 at 76 and have upstanding pins 77 that are urged against the inner edges of levers 41 and 42 by a spring 78. When either lever is moved even slightly, the bell-crank adjacent to it is swung about its pivot 76 by its spring 78, so that the arm 79 of said bell-crank is moved under the front portion of release plate 66.

The latter then cannot be depressed to release the lugs 70 from their engagement with linkage 65. As the levers 41 or 42 are restored to the "zero" position they engage the pins 77 and swing the bell-cranks clear of the plate 66.

When the camera is folded, if either of the knobs 25 or 26 should be turned, the corresponding nuts 33 or 34 would be moved from "zero" position, and if the bed 11 were then swung out, the pins 40 would not enter the notches 40 or 38. In fact, some of the parts might be bent or otherwise damaged. It is desirable therefore that provision be made for locking the knobs 25 and 26 against rotation when the camera is closed.

To meet the foregoing requirement in a simple manner, the bed hinge-brackets 13 may have extended portions bent inwardly to form ears 80, so proportioned that when the bed is returned to close position they will enter the notches 38 and 39 as shown in Fig. 6, thus securely locking the nuts 33 and 34 against movement through any attempt to turn either of the knobs 25 or 26.

I claim:

1. In a folding camera, the combination of a camera body, with a lens board movably mounted relative thereto, a shutter carried by the lens board, means for adjusting the shutter to alter exposure conditions, a setting member movably carried by the camera body, and movably mounted connecting members adapted to contact with and lying between the setting member and means for adjusting the shutter and adapted to move to and from a position in which the camera may fold, whereby the means for adjusting the shutter may be moved by the setting member, a latch member adapted to hold the shutter in a picture-taking position, and means carried by the connecting members between the body setting member and the shutter adjusting means for preventing the release of the latch except when the parts are in a position in which the camera may fold.

2. In a folding camera, the combination of a camera body, with a lens board movably mounted relative thereto, a shutter carried by the lens board, means for adjusting the shutter to alter exposure conditions, a setting member movably carried by the camera body, and movably mounted connecting members between the setting member and means for adjusting the shutter whereby the shutter adjusting means may be moved by the setting member, certain of said members being adapted to move to and from a folding position, means on certain of the connecting members between the body setting member and the shutter adjusting means comprising cooperating latching members adapted to hold the shutter in a picture-taking position until the adjusting members are in a folding position in which the cooperating latching members are automatically released.

3. In a folding camera, the combination with a camera body, of a lens board movably mounted relatively thereto, a shutter carried by the lens board, an adjustable diaphragm carried by the shutter, a diaphragm adjusting member on the shutter, a manually operable diaphragm adjusting member on the camera body, and movable connecting members between the two diaphragm adjusting members adapted to operatively connect the diaphragm adjusting members in the camera body and shutter when the camera is in a picture-taking position, and means operable upon folding the camera for releasing the movable connecting members from a diaphragm adjusting member.

4. In a folding camera, the combination with a camera body, of a lens board movably mounted relatively thereto, a shutter carried by the lens board, an adjustable diaphragm carried by the shutter, a diaphragm adjusting member on the shutter, a manually operable diaphragm adjusting member on the camera body, and movable connecting members between the two diaphragm adjusting members adapted to operatively connect the diaphragm adjusting members on the camera body and shutter when the camera is in a picture-taking position and joints included in said connecting members and operable upon folding the camera for releasing the movable connecting members from a diaphragm adjusting member and a latching lug carried by a movable part of said camera and adapted to lock the diaphragm adjusting member on the camera body only when the camera is folded.

5. In a folding camera, the combination with a camera body, of a lens board movably mounted relatively thereto, a shutter carried by the lens board, an adjustable diaphragm carried by the shutter, a diaphragm adjusting member on the shutter, a manually operable diaphragm adjusting member on the camera body, and movable and foldable connecting members between the two diaphragm adjusting members adapted to operatively connect the diaphragm adjusting members on the camera body and shutter when the camera is in a picture-taking position, and means operable upon folding the camera for releasing the movable and foldable connecting members from a diaphragm adjusting member, a fixed latching lug carried by a movable camera part adapted to engage and lock the diaphragm adjusting means on the camera only when the camera is folded.

6. In a folding camera, the combination with a camera body, of a lens board movably mounted relatively thereto, a shutter carried by the lens board, an adjustable diaphragm carried by the shutter, a diaphragm adjusting member on the shutter, a manually operable diaphragm adjusting member on the camera body, a shutter speed adjusting member carried by the shutter, a shutter speed adjusting means on the camera body, movable and foldable members operatively connecting the adjusting means of the camera body to those on the shutter when the parts are in an operative or picture-taking position, and means for locking the diaphragm and speed adjusting means on the camera body against movement when the camera is folded.

7. In a folding camera, the combination with a camera body, of a lens board movably mounted relatively thereto, a shutter carried by the lens board, an adjustable diaphragm carried by the shutter, a diaphragm adjusting member on the shutter, a manually operable diaphragm adjusting member on the camera body, a shutter speed adjusting means on the camera body, movable and foldable members for operatively connecting the adjusting means of the camera body to those on the shutter when the parts are in an operative or picture-taking position, and means for locking the diaphragm and speed adjusting means on the camera body against movement when the camera is folded, said means being automatically releasable by moving the camera towards an open or picture-taking position.

8. In a folding camera, the combination with a camera body, of a lens board foldably carried with respect to the camera body, a shutter carried by the lens board, an adjustable diaphragm carried by the shutter, a diaphragm adjusting member on the shutter, a manually operable diaphragm adjusting member on the camera body, and connections between the two diaphragm adjusting members comprising a threaded member adapted to be moved transversely of the camera body by the camera body adjusting means, and a pivoted lever intergeared with the diaphragm adjusting member on the camera shutter and connected to the transversely movable threaded member.

9. In a folding camera, the combination with a camera body, of a bed hingedly attached thereto, a camera front hingedly attached to the bed, a latch for holding said front against folding, a movable member carried by the bed and movable to and from a position in which the camera may fold and adapted to prevent release of the latch except when said member is in position for the camera to fold, a shutter carried by the camera front including an exposure adjusting means, an exposure adjusting means on the camera body, operable connecting members between the two exposure adjusting means including said movable member carried by the bed, whereby the exposure adjusting means must be in a predetermined setting before said latch may be released to fold said camera.

10. In a folding camera, the combination with a camera body, of a bed hingedly attached thereto, a camera front hingedly attached to the bed, a latch for holding said front against folding, movabale members adapted to move from a folding position over the bed to a non-folding position beyond the bed and carried by the bed and adapted to prevent release of the latch except when said movable members are in a folding position, a shutter carried by the camera front including a time and diaphragm exposure adjusting means, a time and diaphragm exposure adjusting means on the camera body, operable connecting members between each exposure adjusting means on the camera body and shutter including the movable members carried by the bed, whereby both the time and diaphragm adjusting members must be set in a predetermined position before said latch can be released to fold the camera.

11. In a folding camera including a camera body, a bed hinged thereto and a lens board foldably mounted on the bed, the combination with a latch for holding the lens board in a picture-taking position, a transversely movable member movable from a position in which the camera may be folded to a position in which said member would be damaged by folding the camera and being adapted to release the latch only when in a position in which the camera may be folded, a camera shutter including an adjustable diaphragm carried by the lens board, exposure adjusting means on the shutter for varying the shutter speed, means on the shutter for varying the diaphragm opening, operable connecting members between said exposure adjusting means and said transversely movable member, exposure adjusting means on the camera body for varying the shutter speed and diaphragm opening through said operable connecting members, a lever connecting the exposure adjusting means on the camera body and shutter whereby the exposure adjusting means on the camera body may be moved to a predetermined position to adjust the shutter and simultaneously the transverse member on the bed to a predetermined position, in which the latch may be released to fold the camera.

12. In a folding camera including a camera body, a bed hinged thereto and a lens board foldably mounted on the bed, the combination with a latch for holding the lens board in a picture-taking position, a transversely movable member on the bed having only one position in which the camera may be folded without damage, a camera shutter mounted on the lens board, a first adjusting means on the shutter for varying the shutter speed, a second adjusting means on the shutter for altering the diaphragm opening, operable connecting members between said adjusting means and said transversely movable member, exposure adjusting means on the camera body for varying the shutter speed and diaphragm opening, a member carried by the camera body for adjustment through said exposure adjusting means on the camera body, a lever pivoted to the bed having slidable connections at each end, at one end with said member on the camera body and at the other end with the transversely movable member on the bed, connections between the transversely movable member and one of the adjusting means on the shutter, whereby the parts must be returned to a predetermined position before the said latch may be released to fold the camera.

13. In a folding camera including a camera body, a front movable to and from an erect or picture-taking position, the combination with a shutter carried by the front, shutter adjusting members on the shutter for setting the shutter speed and the diaphragm opening, shutter adjusting members on the camera body for setting the shutter speed and diaphragm opening, movable connecting members for transmitting motion from the latter to the former including a pair of coaxial disks on the camera body, and cooperating indicating means on the body and disks for indicating the shutter settings.

14. In a folding camera including a camera body, a front movable to and from an erect or picture-taking position, the combination with a shutter carried by the front, shutter adjusting members on the shutter for setting the shutter speed and the diaphragm opening, shutter adjusting members on the camera body for setting the shutter speed and diaphragm opening, movable connecting members for transmitting motion from the latter to the former including a pair of coaxial disks on the camera body, one disk mounted on a rotatable shaft and the other disk mounted on a rotatable sleeve shaft and means for transmitting motion from the two shafts through the movable connecting members to the camera shutter.

15. In a folding camera including a camera body, and a front movable to and from an erect or picture-taking position, the combination with a shutter carried by the front, a shutter adjusting member on the shutter for setting the shutter for different exposure conditions, a shutter adjusting disk on the camera body for setting the shutter, a revoluble threaded shaft for supporting said disk carried by the camera body, a nut adapted to move on the threaded shaft, a pivoted lever connection between the nut and shutter for transmitting movement from said shutter adjusting disk on the camera body to said shutter adjusting member on the camera shutter.

16. In a folding camera including a camera body, a front movable to and from an erect or picture-taking position, the combination with a shutter carried by the front, shutter adjusting members on the shutter for setting the shutter speed and the diaphragm opening, shutter adjusting members on the camera body for setting the shutter speed and diaphragm opening and comprising a pair of pivotally mounted disks, a pair of movable shafts carried by the camera body for supporting said disks, a thread on each shaft, a nut adapted to move on each threaded shaft, connections respectively between each nut and a corresponding one of said shutter adjusting members on the shutter for transmitting movement respectively from each shutter adjusting disk on the camera body to a corresponding shutter adjusting member on the camera shutter, each of said connections comprising a gear ring carried by the shutter, and a slidable rack meshing with the gear ring and slidable on the camera front, and connections between the slidable rack and movable nut for setting the shutter from the camera body.

17. In a folding camera including a camera body, a front movable to and from an erect or picture-taking position, the combination with a shutter carried by the front, shutter adjusting members on the shutter for setting the shutter speed and the diaphragm opening, shutter adjusting members on the camera body for setting the shutter speed and diaphragm opening, movable connections for transmitting motion from the latter to the former including a pair of coaxial disks on the camera body, and a pair of coaxial rings on the camera shutter and movable connecting members between the disks and rings adapted to contact and transmit movement for operating the latter from the former.

18. In a folding camera including a camera body, and a front movable to and from an erect or picture-taking position, the combination with a shutter carried by the front, shutter adjusting members on the shutter for setting the shutter speed and the diaphragm opening, shutter adjusting members on the camera body for setting the shutter speed and diaphragm opening, movable connections for transmitting motion from the latter to the former including a pair of coaxial disks on the camera body, and a pair of coaxial rings on the camera shutter, and connections between the disks and rings including transversely movable elements on the camera body and camera front, and movable members adapted to contact with the movable elements on the camera body and engaging the movable elements on the camera front whereby motion may be transmitted from the shutter adjusting members on the camera body to the shutter adjusting members on the shutter.

19. In a folding camera including a camera body, a front movable to and from an erect or picture-taking position, the combination with a shutter carried by the front, shutter adjusting members on the shutter for setting the shutter speed and the diaphragm opening, shutter adjusting members on the camera body for setting the shutter speed and diaphragm opening, movable connections for transmitting motion from the latter to the former including a pair of coaxial disks on the camera body, and a pair of coaxial rings on the camera shutter, and connections between the disks and rings for operating the latter from the former including transversely movable elements on the camera body and camera front, and pivoted levers having opposite ends operably connected to the transversely movable members on the camera body and camera front.

20. In a folding camera including a camera body, a front movable to and from an erect or picture-taking position, the combination with a shutter carried by the front, shutter adjusting members on the shutter for setting the shutter speed and the diaphragm opening, shutter adjusting members on the camera body for setting the shutter speed and diaphragm opening, movable connections for transmitting motion from the latter to the former including a pair of coaxial disks on the camera body, and a pair of coaxial rings on the camera shutter and connections between the disks and rings for operating the latter from the former including transversely movable elements on the camera body and camera front operably connected to the disks and rings, and pivoted levers having opposite ends operably connected to the transversely movable members on the camera body and camera front, the transversely movable members on the camera fronts including racks intergeared to the coaxial rings on the camera shutter.

21. In a folding camera including a camera body, a front movable to and from an erect or picture-taking position, the combination with a shutter carried by the front, shutter adjusting members on the shutter for setting the shutter speed and the diaphragm opening, shutter adjusting members on the camera body for setting the shutter speed and diaphragm opening, movable connecting members adapted to contact with and for transmitting motion from the latter to the former including a pair of coaxial disks on the camera body, slotted transversely movable members mounted in the camera body connected to and movable by the coaxial disks, and latching members adapted to engage said slots and lock said disks against movement when said camera is folded.

22. In a folding camera including a camera body, a front movable to and from an erect or picture-taking position, the combination with a shutter carried by the front, shutter adjusting members on the shutter for setting the shutter speed and the diaphragm opening, shutter adjusting members on the camera body for setting the shutter speed and diaphragm opening, movable connecting members adapted to contact with and for transmitting motion from the latter to the former including a pair of coaxial disks on the camera body, threaded shafts carrying said disks, slotted transversely movable members mounted on said threaded shafts in the camera body movable by the coaxial disks, and latching members carried by a folding part of the camera adapted to be brought into engagement with the slots by folding the camera for holding the disks against movement when the camera is folded and adapted to move from the slots to release said slots when the camera is unfolded towards a picture-taking position.

AUGUST NAGEL.